Oct. 8, 1929.  P. R. FORMAN  1,730,880
PNEUMATICALLY OPERATED TRAP AND DOOR FOR VEHICLES
Filed Jan. 9, 1926    5 Sheets-Sheet 2
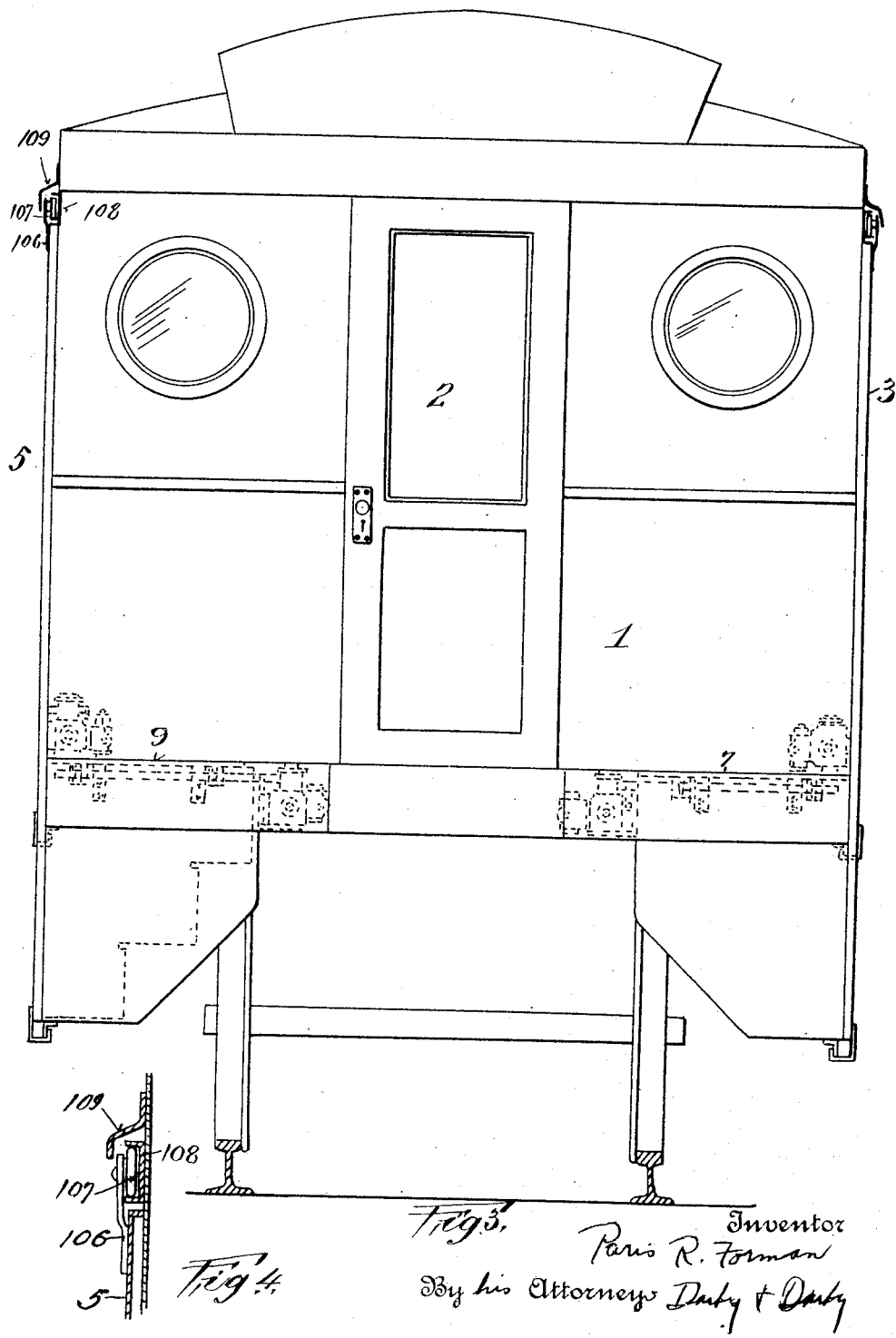

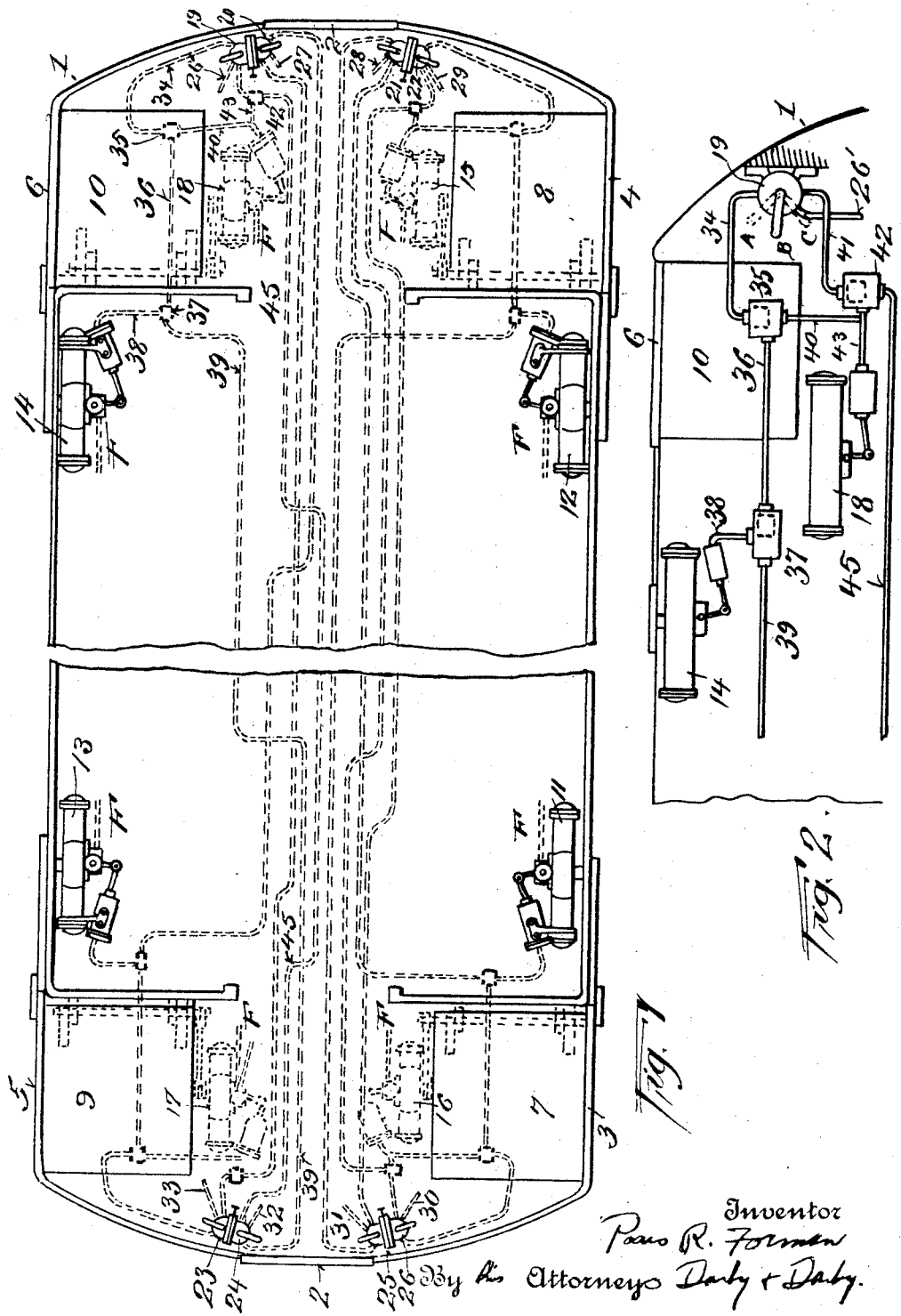

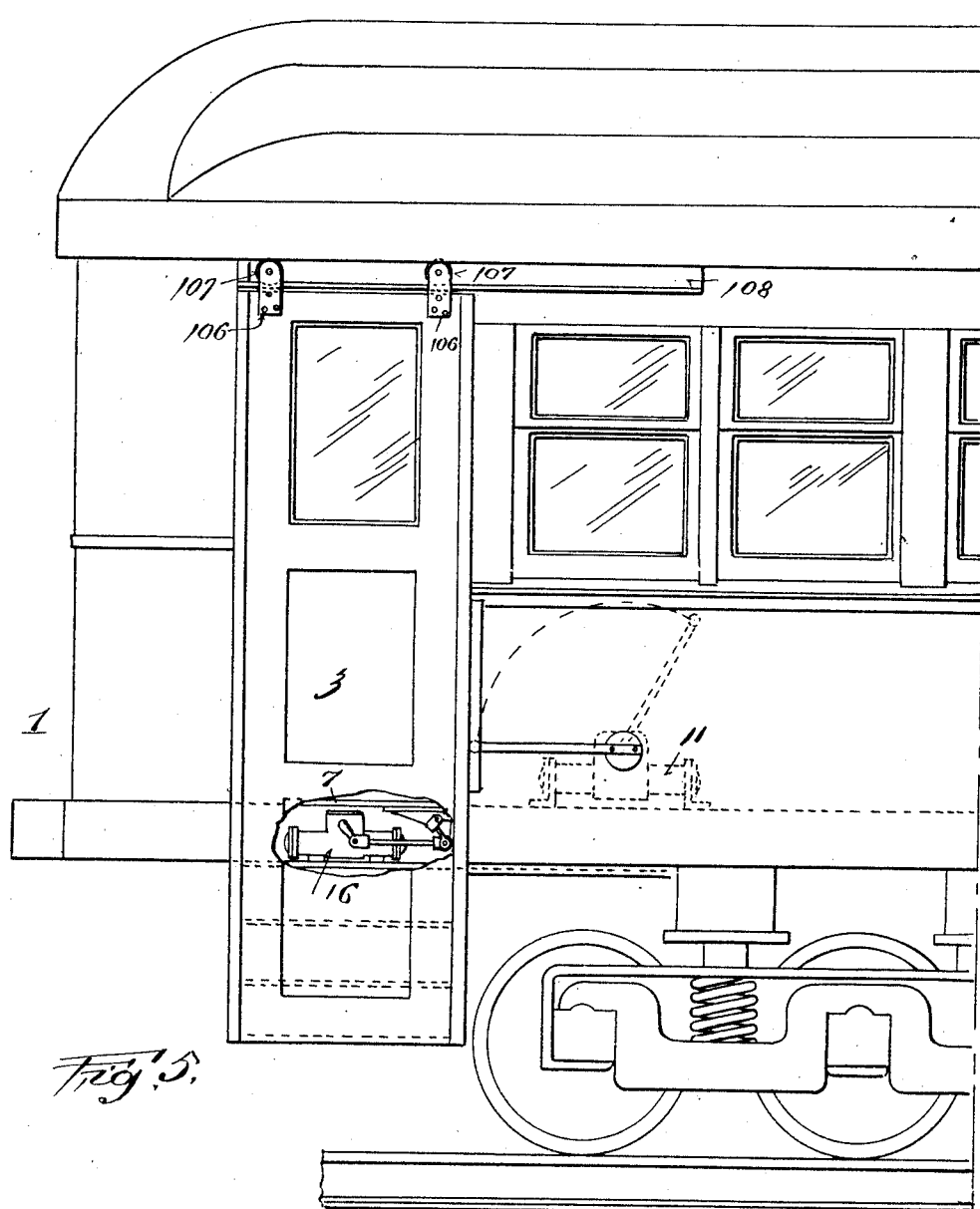

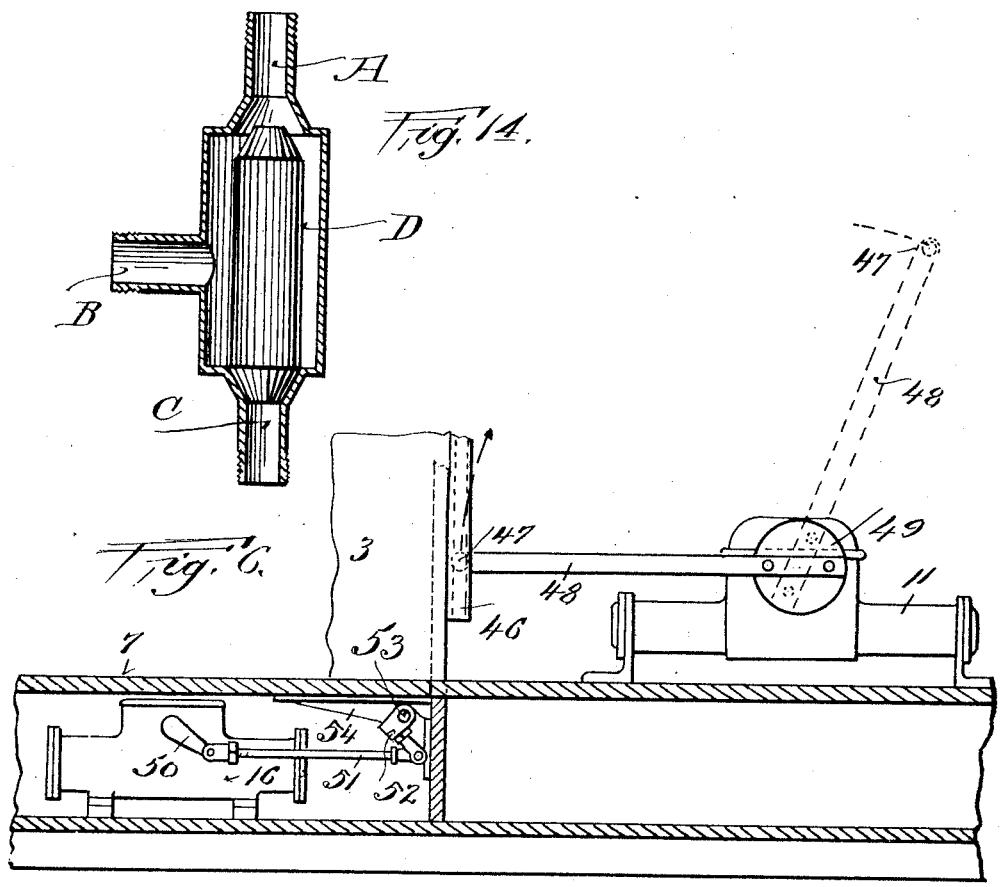

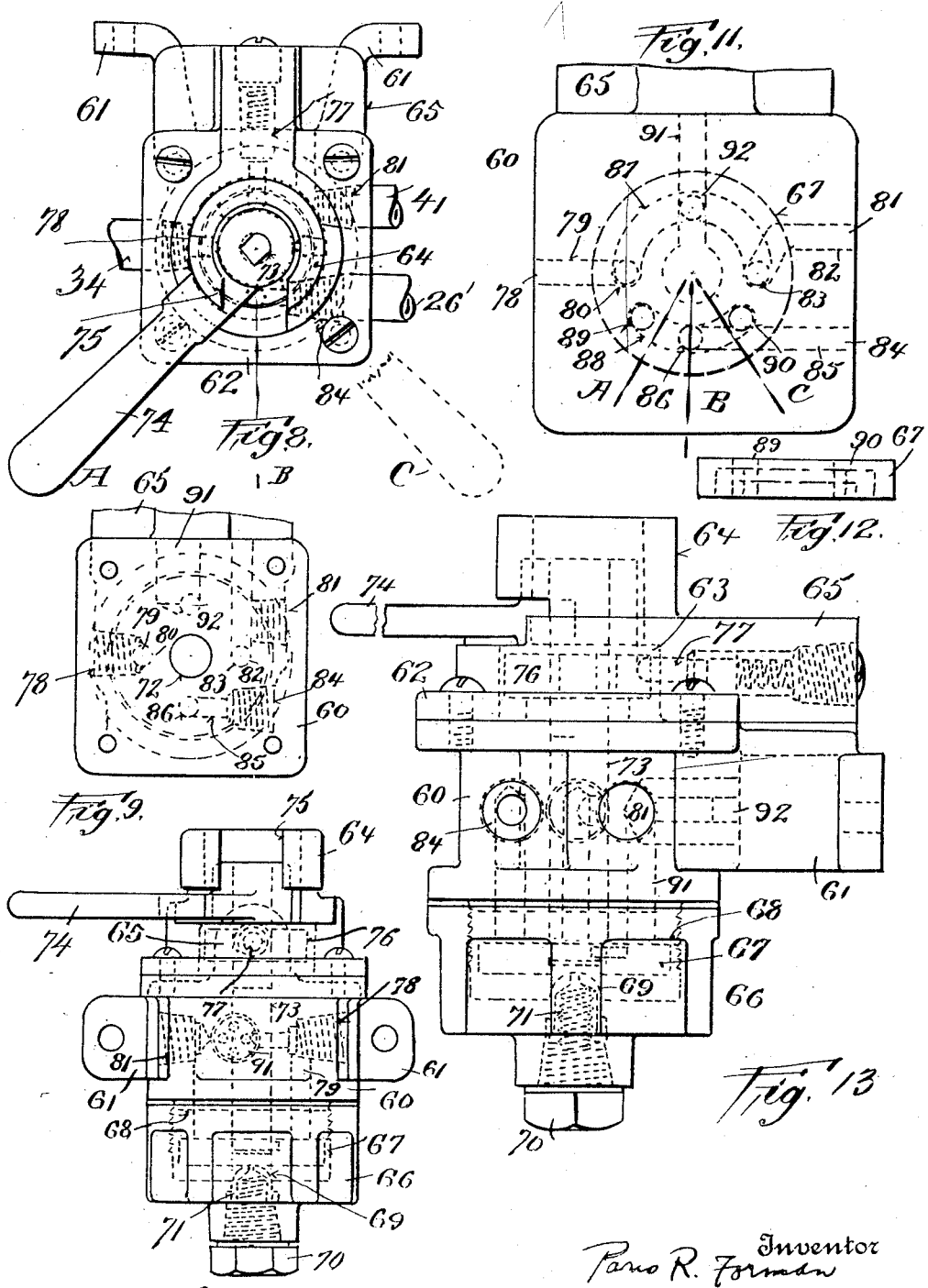

Patented Oct. 8, 1929

1,730,880

UNITED STATES PATENT OFFICE

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA

PNEUMATICALLY-OPERATED TRAP AND DOOR FOR VEHICLES

Application filed January 9, 1926. Serial No. 80,229.

The general object of this invention relates to a pneumatically operated trap and door for vehicles such as steam cars and the like.

One of the objects of this invention is to provide a pneumatic system for controlling the operation of traps and doors on vehicles by means of which the conductor or guard may stand on the platform between two adjacent cars and open all the doors on one side or on the other, or on both sides of the two cars between which he is standing.

Another object is to provide a pneumatic system of trap and door control whereby the operator standing between two adjacent cars may select and open any one door or group of doors on the two cars between which he is standing.

It is also within the purview of this invention to provide air jumpers between a number of cars so that an operator may control the operation of the doors in any number of cars from one point.

A still further object of this invention is the provision of a pneumatic system of trap and door control whereby the doors alone may be opened in any of the sequences, described above or both the traps and doors may be so opened.

A further object of this invention is to provide a three-way valve of special construction by means of which the door at one end and on one side of the car may be opened, or both the trap and door may be opened.

By the provision of four of these valves at each end of the car, it is possible to open as desired any one door and trap or finally all the doors, or all the doors and traps at the four corners of the car. It is also possible for the operator from his position between two adjacent cars to control all the doors on the two cars as just described and by means of air jumpers to selectively control the operation of all the doors in a train of any number of cars.

These and other objects will appear in the description which follows.

The invention comprises substantially the construction, combination, arrangement and relative location of parts as will be more fully disclosed hereinafter.

Referring to the drawings in which the same reference numerals are used to indicate the same parts throughout the several views, Fig. 1 is a diagrammatic plan view of a vehicle showing the trap and door controlling system in place.

Fig. 2 is an enlarged fragmentary view more or less diagrammatic, showing the trap and door engines, the control valve and the necessary piping for controlling the operation of the door and trap at one end and side of a vehicle.

Fig. 3 is an end elevational view of a vehicle showing the relative location of the trap and door engines.

Fig. 4 is an enlarged detailed view of the method of supporting the door.

Fig. 5 is a fragmentary side elevational view of a vehicle with parts of the door broken away showing the location of the trap and door engines.

Fig. 6 is an enlarged fragmentary view of the trap and door engines and the mountings.

Fig. 7 is a view similar to that of Fig. 6 but looking towards the front of the car.

Fig. 8 is a top plan view of the three way valve.

Fig. 9 is a plan view of the valve block.

Fig. 10 is a front elevational view of the three-way valve.

Fig. 11 is a plan view of the valve block showing the valve head superposed on its seat.

Fig. 12 is an elevational view of the valve head showing the arrangement of the passages.

Fig. 13 is a side elevational view of the three-way valve.

Fig. 14 is an enlarged cross-sectional view of a double check valve.

The present day practise in multiple unit train operation in crowded cities of making up a long train of cars to accommodate the rush hour crowds necessitates some convenient method of trap and door control adapted to the common method of adding to or removing cars from a train as needed. It is necessary to provide a system whereby the traps and doors may be selectively controlled from the same point or points as new cars are added to or removed from a train without causing any undue delay in making air connections between the fluid pressure lines of the individual train units. These conditions must be met for a system where a minimum number of conductors or operators are used as is the general tendency in modern railway operation.

My system at once meets all these conditions since it is so constructed that by adding air jumpers between the fluid pressure lines of the cars as they are added the doors on all train units may be selectively controlled from a single point by a single operator or from a plurality of points by as many operators if desired.

In Figs. 1 to 7, inclusive, the vehicle body is shown in general at 1 having at each end doors 2, 2 which provide easy movement of passengers between the several units of a train. At each of the corners of the car are provided doors 3, 4, 5, 6 and step trap doors 7, 8, 9, 10 respectively. The doors 3, 4, 5, 6 are operatively connected respectively to pneumatic door engines of the well known balanced piston type, 11, 12, 13 and 14, and the trap doors 7, 8, 9, 10 are respectively connected to pneumatic engines 15, 16, 17, 18 of the same type.

At each end of the car are provided four three-way valves which are indicated as 19, 20, 21, 22, 23, 24, 25 and 26. All of these valves are exactly the same in construction and will be described in detail later.

The feed pipe lines 26′, 27, 28, 29, 30, 31, 32 and 33 are connected between valves 19, 20, 21, 22, 23, 24, 25 and 26 respectively and the fluid pressure supply tank, which is not shown, for the sake of clearness.

The view of Fig. 2 will now be described in detail since all the other valves work in the same way. When the valve handle of valve 19 is in position A, fluid pressure is supplied from the source through line 26′, through the valve, as will be explained, line 34, double check valve 35 which prevents fluid pressure from getting into line 40, line 36, double check valve 37 which prevents fluid pressure from getting into line 39, line 38 and thence to the valve puller on door engine 14 which will then open the door 6. On the other hand, if the valve handle is moved to position C, fluid pressure travels from the source through feed pipe 26′, through the valve 19, line 41, double check valve 42, which prevents fluid pressure from reaching line 45, line 43 and thence to the valve puller of the step trap door engine 18 which then opens the trap door 10. At the same time fluid pressure travels through line 40, double check valve 35, line 36, double check valve 37, and line 38 to open the door 6 as before. Thus when the valve handle is in position C both the trap and door are opened.

In Fig. 14, a double check valve is shown which has a hollow body portion with three integral threaded nipples A B and C. Within the body portion is a movable cylindrical member D having tapered ends which seat respectively in opposite ends of the body portion. When fluid pressure is applied at A, D moves so as to close off C and permit fluid pressure to travel from A to B. When fluid pressure is applied at C, D closes A and permits fluid pressure to travel from C to B.

As may be readily traced in Fig. 1, when the valve handle of valve 20 is in position A door 5 may be opened and when in position C both trap 9 and the door 5 are opened. When the valve 19 is in position B, fluid pressure is exhausted from both lines 34 and 41 (see Fig. 2) and the door 6 and corresponding trap will close. In a like manner valve 22 controls door 4 and trap 8, and valve 21 controls door 3 and trap 7. A similar control may be had of all the doors and traps from the other end of the car using valves 23, 24, 25 and 26.

It is, of course, evident, that the three-way valves may be placed on the exterior of the end walls of the car as disclosed in the Hedley et al. Patent No. 1,561,467 of November 17, 1925 so that the operator may stand on the platform between two adjacent cars and selectively control the doors on any number of cars when air jumpers are used between adjacent cars.

The pipes marked F lead from the fluid pressure source to the door engines which as has been stated are of the well known balanced piston type extensively used in this art.

In Fig. 4 is shown, in detail, the door support. The door 5 is supported by a bracket 106 having a roller 107 riding in the track 108 and provided with a rain shield 109.

In Figs. 6 and 7 are shown in detail the connections between the engines and the trap and door. At the back edge of the door 3 is a track 46 in which a roller 47 mounted on the lever 48 rides. The lever 48 is bolted to the disk 49 on the door engine which disk is adapted to be rotated by the movement of the piston. Thus, as the arm 48 is rotated upwardly, the door 3 slides to the right.

On the trap door engine 16 is a lever 50, adapted to be oscillated by the engine piston, having pivotally attached thereto a rod 51 connected to a bell crank lever 52. The crank lever 52 is rigidly secured to the rotatable shaft 53 which has secured thereto two arms 54 upon which is secured the trap door 7. Thus when the arm 50 moves to the left the arms 54 move upwardly carrying the trap with them.

A detailed description of the three-way valve follows:

Referring to Figures 8 to 13, the valve includes a block 60 having integral projections 61 to be used as supports. On the upper face of the block 60 is bolted a cap 62 having a hollowed out portion 63 (Figure 13), a hood member 64, and projection 65. On the bottom end of the block 60 is screwed a hollow cap 66 which encloses the valve head 67 for the valve seat 68 formed on the bottom face of the block 60. In the cap 66 is a spring pressed thimble 69 which aids in holding the valve head on the valve seat. The thimble is forced upwardly by means of a threaded plug 70 and a spring 71 lying within the thimble 69.

Extending vertically through the hole 72 in the valve block 60 is a valve stem 73 having its upper end D-shaped to receive a handle 74 with an opening to fit over the D-shaped end. It will be noted that the handle 74 can only be put on or taken off in its position B through the slot 75 in the cap 64.

Encircling the valve stem 73 and secured thereto is a collar 76 having detents therein which engage the spring pressed plunger 77 in the extension 65. This plunger holds the valve in any one of its three positions until forcibly removed therefrom. The valve head 67 receives the valve stem 73 for rotation with it.

A threaded opening 78 in the block 60 is connected by passage 79 to port opening 80 in the valve seat, and is intended to receive the pipe line 34. The pipe line 41 is attached to threaded opening 81 which is connected by passage 82 to port 83 in the valve seat. The pipe 26' screws into opening 84 which is connected by a passage 85 to the port opening 86 in the valve seat. The exhaust passage 91 is connected to the groove 87 through port 92.

The valve head 67 has a groove 87 and a groove 88 in its face, said groove 88 having at its ends, holes 89 and 90, extending through the valve head.

The operation of the valve is as follows:

When the valve handle is in position A fluid pressure enters passage 84 through pipe 26', and travels through passage 85, port 86, groove 88, port 80, passage 79 and thence to the valve puller of the associated door engine through pipe 34. At the same time the fluid pressure passes through hole 89 in the valve head 67 into the chamber of the cap 66 to aid in maintaining the valve head on its seat.

When the valve handle is moved to position C, fluid pressure from the source enters passage 85 through pipe 26' and then travels through port opening 86, groove 88, port opening 83, passage 82 and thence to the valve puller on the associated trap engine through pipe line 41. As before fluid pressure aids in holding the valve head on its seat by traveling through the hole 90 on the valve head.

Finally, when the valve handle is in position B, the lines connected to threaded openings 78 and 81, exhaust through groove 87, port opening 92, passage 91 and thence to the atmosphere.

It will be seen by the above description that I have produced a valve and door control system which is simple and cheap to construct and easy to maintain in efficient operating condition.

It is evident that many changes will readily suggest themselves to one skilled in the art, and I do not desire to be limited by the preferred embodiment which has been shown for purposes of illustration but rather by the spirit and scope of the appended claims by which I define the invention.

What I seek to secure by Letters Patent is—

1. In a trap and door control system, for vehicles, separate means for operating the door and trap, circuit means for each of said first mentioned means and a single means in said circuit for independently controlling said trap and door operating means.

2. In a trap and door control system for vehicles, the combination of separate means for operating the trap and door with single pneumatic means for selectively controlling the operation of said operating means.

3. In a vehicle having trap and door way barriers, independent means for operating said barriers and pneumatic means for controlling said operating means whereby either the door way barriers or the trap and door way barriers may be operated from a single point.

4. In a vehicle having a plurality of trap and door way barriers, independent means for operating said barriers and pneumatic means for controlling said means whereby either a door barrier or door and trap barrier may be opened.

5. In a vehicle having a plurality of trap and door ways, barriers in said ways, pneumatic means for operating said barriers, and a plurality of independent means for independently operating said barriers from a plurality of points.

6. In a train comprising a plurality of vehicle units having trap and door ways, barriers in said ways and a plurality of manually operated pneumatic means for selectively controlling either the door barriers or the trap and door barriers in said plurality of vehicle units.

7. In a train comprising a plurality of vehicle units having trap and door ways, barriers in said ways, and a plurality of independent manual means for selectively controlling from a single station the operation of all the door barriers or all the trap and door barriers on one side of the train.

8. In a train comprising a plurality of vehicle units having trap and door ways, barriers in said ways, pneumatic means for opening said barriers, and a plurality of valve means at a single control point for selectively controlling said opening means whereby all the door barriers or all the trap and door barriers on one side of the train may be opened.

9. In a train comprising a plurality of vehicle units having trap and door ways, barriers in said ways, pneumatic means for opening said barriers, and a plurality of control means between any two adjacent units of a train for selectively operating all the barriers on either side of the train.

10. In a train comprising a plurality of vehicle units having trap and door ways, barriers in said ways, pneumatic means operable to open said barriers, and a plurality of valve means operable from a point between any two adjacent vehicle units whereby all the door barriers or the door and trap barriers on one side of the train may be opened.

11. In a vehicle having trap and door ways, barriers in said ways, a plurality of means comprising pneumatic door engines for selectively opening said barriers, a plurality of three-way valves and circuit means between said engines and valves.

12. In a vehicle having trap and door ways, barriers in said ways, a plurality of means comprising pneumatic door engines for opening said barriers, a plurality of manually operated valves, and pneumatic circuit connections including double check valves whereby either the door barriers or trap and door barriers may be operated.

13. In a vehicle having trap and door ways, barriers in said ways, a plurality of means comprising pneumatic door engines for opening said barriers, a plurality of three-way valves and pneumatic circuit connections including double check valves whereby all the door barriers or all the trap and door barriers on one side of the vehicle may be operated independently.

14. In a train comprising a plurality of vehicle units having trap and door ways, barriers in said ways, a plurality of means comprising a door engine for each trap barrier and a door engine for each door barrier, a plurality of three-way valves at each end of each vehicle unit, and circuit connections including double check valves for said engines and valves whereby from a point between any two adjacent units of the train all the door barriers or all the trap and door barriers may be operated.

15. In a train comprising a plurality of vehicle units having trap and door ways, barriers in said ways, a plurality of means comprising a door engine for each trap barrier and a door engine for each door barrier, a plurality of three-way valves at each end of each vehicle unit, and circuit connections including double check valves for said engines and valves whereby from a point between any two adjacent units of the trains all the door barriers, or all the trap and door barriers on one side of the train may be operated.

16. In a vehicle having trap and door ways, barriers in said ways, means for operating said barriers and means at each end of said vehicle for selectively controlling either all the door barriers or all the trap and door barriers on one side of the vehicle.

17. In a vehicle having trap and door ways, barriers in said ways, means for operating said barriers and means at each end of said vehicle for selectively controlling all the barriers in said vehicle.

18. In a vehicle having trap and door ways, barriers in said ways, means for operating said barriers and means at each end of said vehicle for selectively controlling all the door barriers or all the door and trap barriers in said vehicle from either end of said vehicle.

19. In a vehicle having trap and door ways, barriers on said ways, a plurality of means for operating said barriers, pneumatic means for selectively controlling said means to open either the door barriers or the trap and door barriers, said pneumatic control means being so constructed as to permit closing said barriers.

In testimony whereof I have hereunto set my hand on this 30th day of December A. D., 1925.

PARIS R. FORMAN.